United States Patent [19]

Milliman

[11] Patent Number: 5,665,164
[45] Date of Patent: Sep. 9, 1997

[54] CO-EXTRUSION CROSS-HEAD DIE APPARATUS

[76] Inventor: James A. Milliman, 8644 Emerald Cir. South, Rome, N.Y. 13440

[21] Appl. No.: 581,845

[22] Filed: Jan. 2, 1996

[51] Int. Cl.⁶ .................. B05C 3/02; B05C 3/12; A23G 1/22; A23G 3/16
[52] U.S. Cl. .................. 118/420; 118/405; 118/419; 118/DIG. 18; 118/DIG. 19; 425/713
[58] Field of Search .................. 118/405, 419, 118/420, DIG. 18, DIG. 19; 425/113

[56] References Cited

U.S. PATENT DOCUMENTS

| | | | |
|---|---|---|---|
| 2,893,056 | 7/1959 | Henning | 118/405 |
| 2,905,522 | 9/1959 | Fahringer | 118/405 |
| 3,305,893 | 2/1967 | Machen | 425/376.1 |
| 3,538,547 | 11/1970 | Drabb | 425/133.1 |
| 3,694,131 | 9/1972 | Stuart | 425/461 |
| 3,737,490 | 6/1973 | Nicholson | 425/113 |
| 3,960,530 | 6/1976 | Iyengar | 65/3 |
| 4,505,222 | 3/1985 | Holt et al. | 118/304 |
| 4,510,884 | 4/1985 | Rosebrooks | 118/405 |
| 4,533,570 | 8/1985 | Iyengar | 427/163 |
| 4,585,407 | 4/1986 | Silver et al. | 425/114 |
| 4,688,515 | 8/1987 | Rosebrooks | 118/405 |
| 4,765,271 | 8/1988 | Jochem et al. | 118/405 |
| 4,773,954 | 9/1988 | Starnes, Jr. | 156/244.12 |
| 4,982,688 | 1/1991 | Rothen | 118/420 |
| 5,031,568 | 7/1991 | Milliman | 425/113 |
| 5,156,715 | 10/1992 | Starnes, Jr. | 156/500 |
| 5,160,541 | 11/1992 | Fickling et al. | 118/405 |
| 5,183,669 | 2/1993 | Guillemette | 425/113 |
| 5,316,583 | 5/1994 | Milliman | 118/405 |
| 5,360,482 | 11/1994 | Belvedere | 118/404 |
| 5,540,775 | 7/1996 | Milliman | 118/405 |

*Primary Examiner*—Donald E. Czaja
*Assistant Examiner*—Jacqueline A. Ruller
*Attorney, Agent, or Firm*—Charles S. McGuire

[57] ABSTRACT

Co-extrusion cross-head die apparatus for applying two coating materials in inner and outer layers to an electrical wire, or the like. A body member has a through, axial bore in which a tip and die members, with respective tip and die holders, are positioned. A pair of radial bores, with which sources of two flowable coating materials communicate, extend from the exterior of the body member to the axial bore. The first coating material flows forwardly of the apparatus through a first flow passage, the second coating material flows rearwardly through a second flow passage, and the two materials flow forwardly, in superposed relation, through a third flow passage from a confluence of the first and second passages to an orifice in the die member where they are deposited in uniform, inner and outer layers, on the wire.

34 Claims, 6 Drawing Sheets

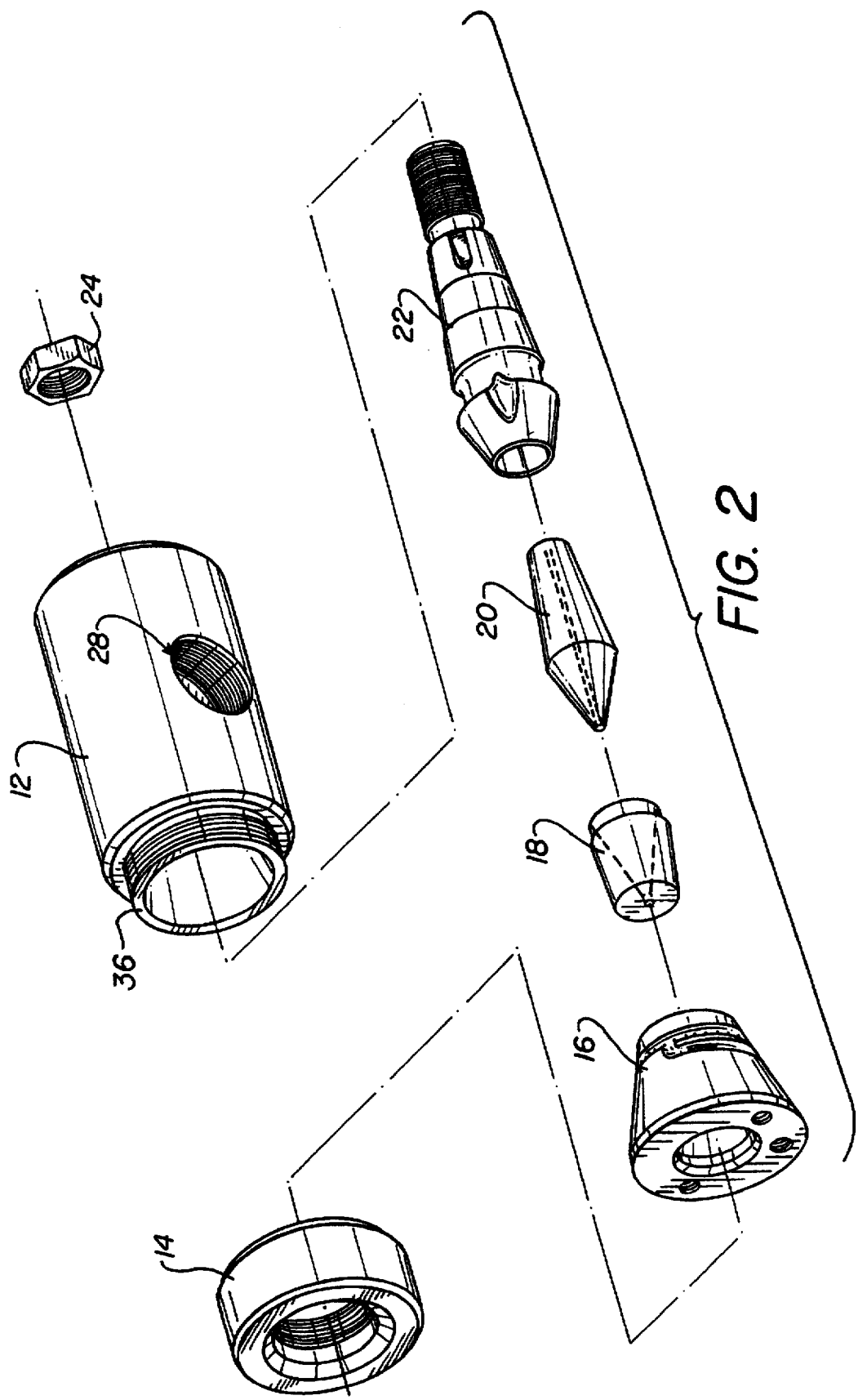

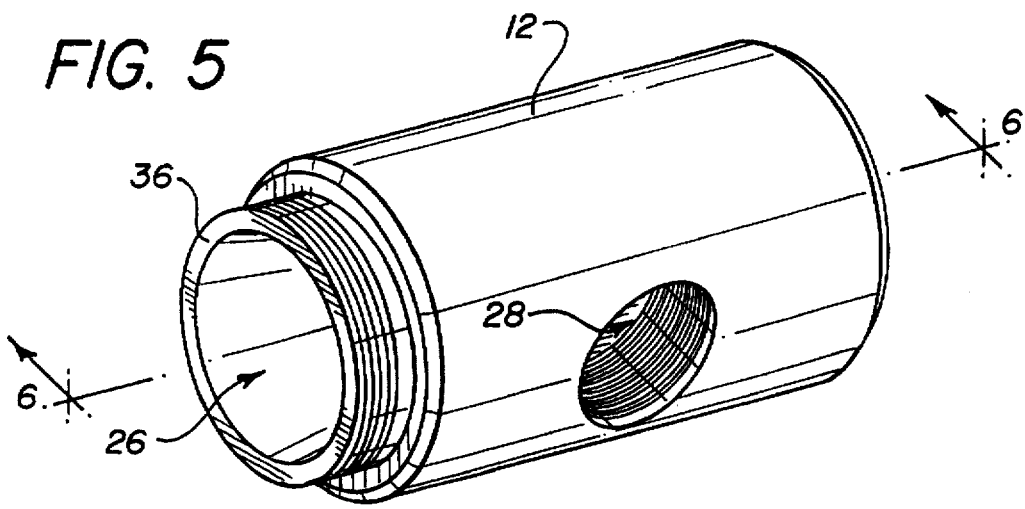
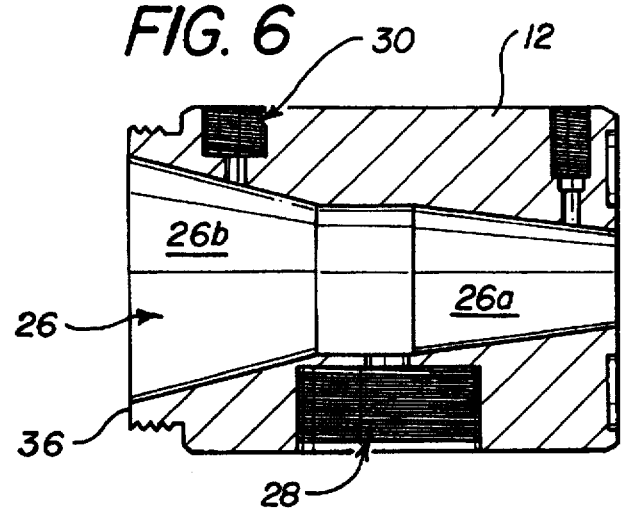
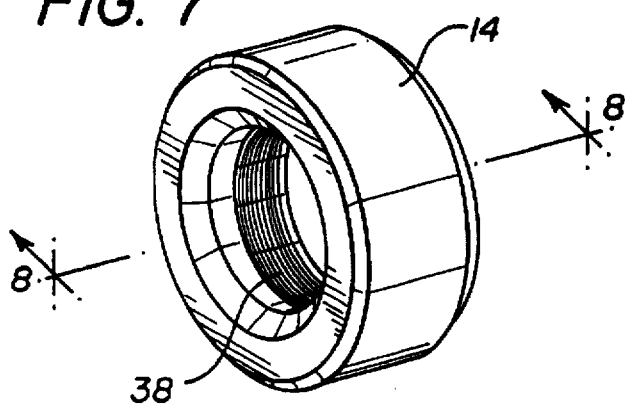
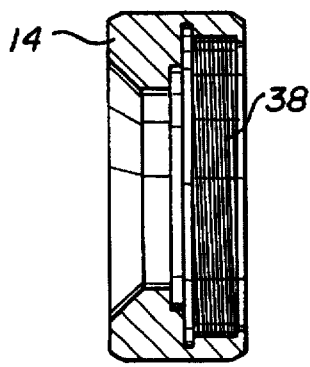

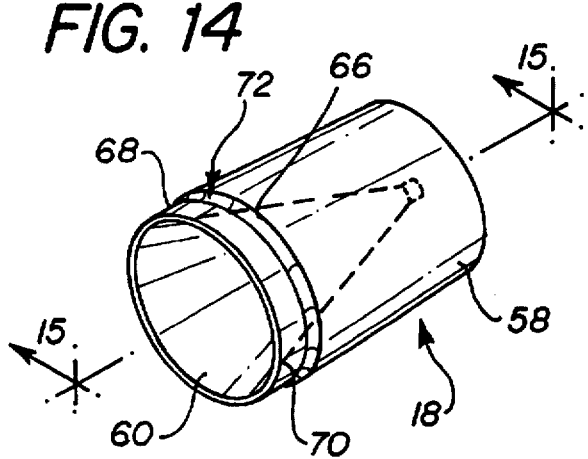
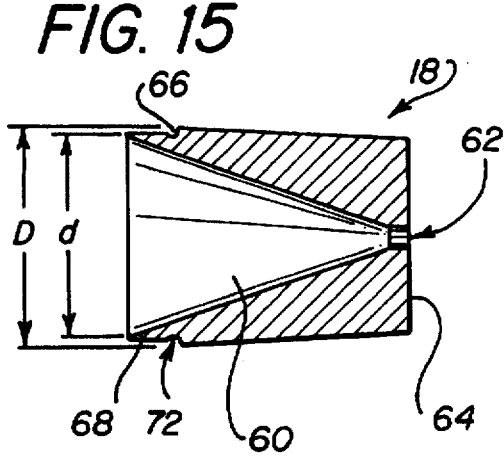
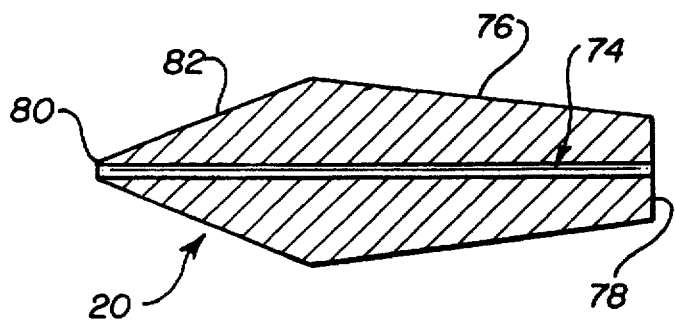
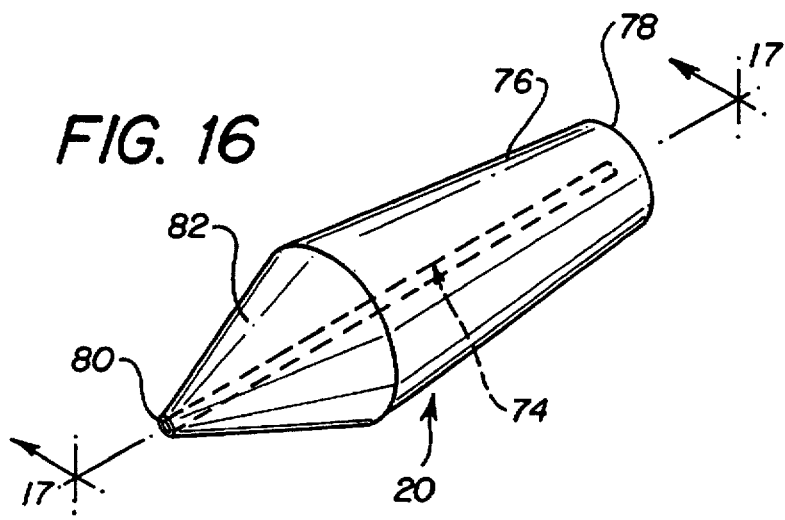

5,665,164

CO-EXTRUSION CROSS-HEAD DIE APPARATUS

BACKGROUND OF THE INVENTION

The present invention relates to die assemblies of the cross-head type for applying coating materials to a filamentary member, e.g., plastic insulation to electrical wires. More specifically, the invention relates to novel and improved co-extrusion, cross-head die apparatus for simultaneously applying two layers of coating materials, i.e., an inner and an outer layer, to a filamentary member as it is moved longitudinally through the apparatus.

Cross-head die assemblies, such as those disclosed in U.S. Pat. Nos. 5,031,568 and 5,316,583 of the present inventor, include a body portion having a through, axial bore communicating with a radial bore. A tip member, having a through bore for establishing the path of travel of the filamentary member, is supported in the body axial bore by a tip holder, also referred to as a core tube. External surfaces on the tip and holder cooperate with internal surfaces on the die elements to define a flow path for the coating material, which is heated in order to be in a flowable state. The flow path leads to a die orifice through which the filamentary member and coating material pass as the coating layer is applied.

It is sometimes necessary to apply two layers of coating material, one in covering relation to the other, to electrical wires, or the like. This may be accomplished by providing in the body portion two radial bores, through which sources of the two coating materials communicate at different locations within the axial bore. It is difficult, however, to ensure proper flow of the two materials through the die apparatus, providing the necessary symmetrical, coaxial coating layers.

It is a principal object of the present invention to provide cross-head die apparatus for applying inner and outer layers of coating materials to a filamentary member in a unique manner, resulting in superior, double-layered coatings.

Another object is to provide co-extrusion, cross-head die apparatus which simplifies and facilitates the application of two, superposed layers of coating materials to a filamentary member.

Other objects will in part be obvious and will in part appear hereinafter.

SUMMARY OF THE INVENTION

The die apparatus of the invention comprises an assembly of elements including the usual body member with through, axial bore, a tip, tip holder (core tube), die member and die holder. Two radial bores in the body member communicate with the axial bore therein. The rear portion of the tip holder external surface is in mating engagement with a portion of the interior surface of the body axial bore, and an annular groove, extending 360° around the tip holder is positioned inwardly adjacent one of the radial bores in the body. The annular groove communicates through three axial grooves with a flow passage extending over the forward surface portion of the tip holder and the tip.

The die member having the orifice through which the coating materials are extruded is matingly engaged on its external surface with a die holder which in turn is matingly engaged with the forward surface portion of the axial bore. A first annular groove extends 180° about the external surface of the die holder and is positioned with its midpoint inwardly adjacent the second radial bore in the body member to receive the second coating material. The first annular groove communicates at its ends with a second annular groove, positioned rearwardly of the first groove and extending 360° about the die holder.

A succession of evenly spaced, small openings extend through the die holder about the second annular groove. The second coating material flows from the second radial bore into the first annular groove of the die holder and thence into the second annular groove at diametrically opposite positions. The second coating material flows entirely around the second annular groove and through the openings therein into a flow passage defined between an internal surface portion of the die holder and the external surface of a portion of the die member extending rearwardly from the portion in mating engagement with the die holder.

The second coating material flows rearwardly of the apparatus for a short distance before flowing forwardly through a flow passage common to the first coating material defined between external surface portions of the tip holder and tip and the internal surface of the die member. The second coating material flows through this passage in superposed relation with the first coating material. It is in this relation that the two materials pass through the die orifice, coaxially surrounding the filamentary member.

The foregoing and other features and advantages of the invention will be more readily understood and fully appreciated from the following detailed description taken in conjunction with the accompanying drawings, which are now referred to.

BRIEF DESCRIPTION OF THE DRAWINGS

FIG. 2 is an exploded perspective view showing separately the elements forming the apparatus of FIG. 1;

FIG. 5 is a perspective view of the body member of the apparatus;

FIG. 6 is a side elevational view in section on the line 6—6 of FIG. 5;

FIG. 7 is a perspective view of a retaining collar of the apparatus;

FIG. 8 is a side elevational view in section on the line 8—8 of FIG. 7;

FIG. 14 is a perspective view of the die element;

FIG. 15 is a side elevational view on the line 15—15 of FIG. 14;

FIG. 16 is a perspective view of the tip element;

FIG. 17 is a side elevational view on the line 17—17 of FIG. 16;

DETAILED DESCRIPTION

Figure 1:
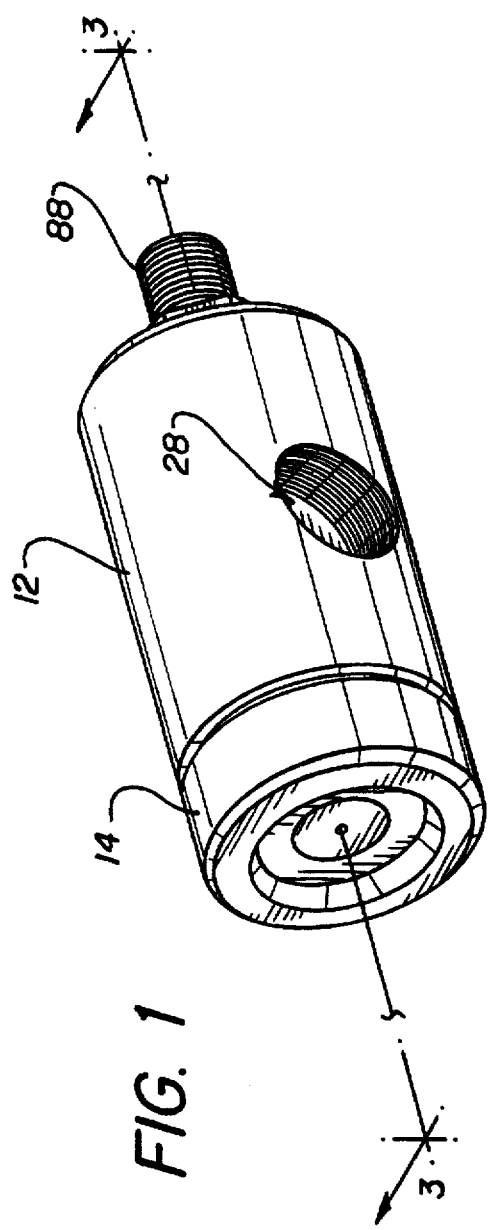
FIG. 1 is a perspective view of fully assembled cross-head die apparatus embodying the present invention.
Figure 3:
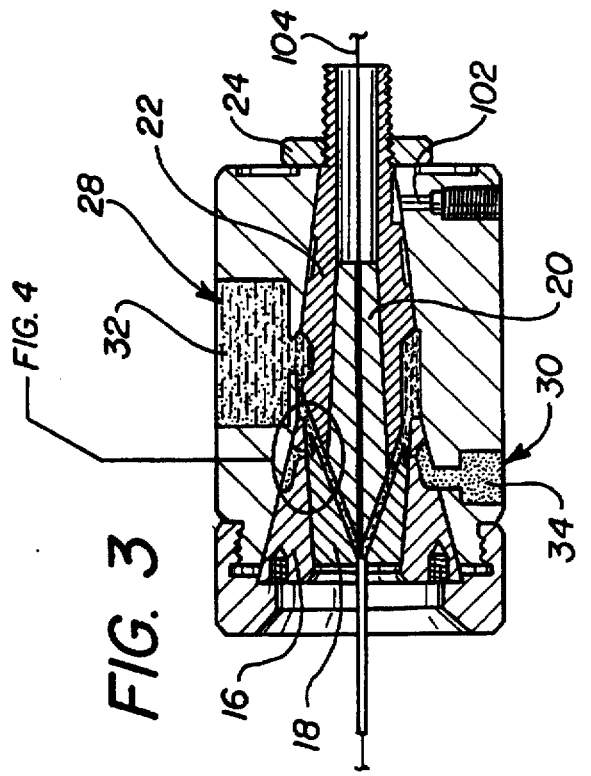
FIG. 3 is a side elevational view in full section on the line 3—3 of FIG. 1.
Figure 4:
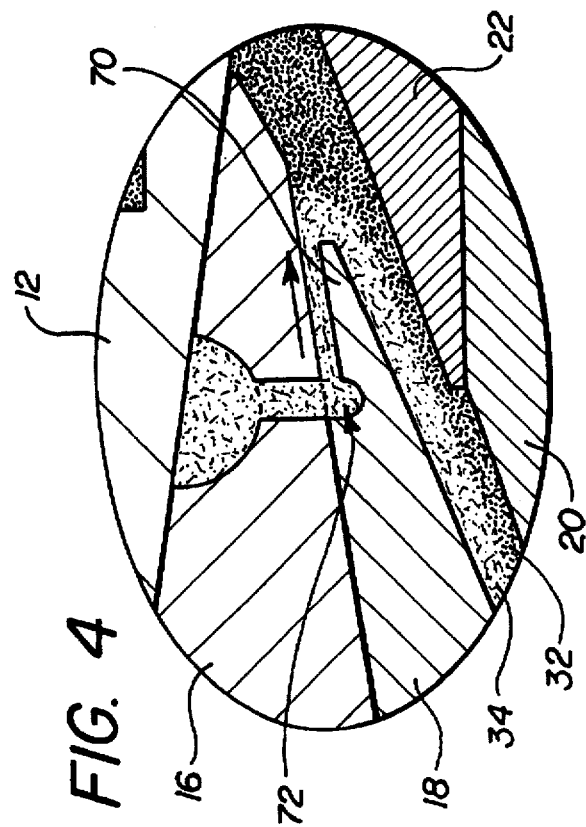
FIG. 4 is an enlarged fragment of the circled portion of FIG. 3.
Figure 9:
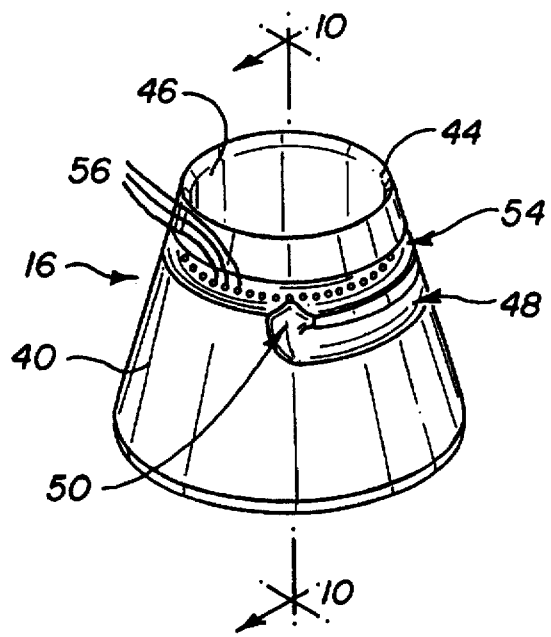
FIG. 9 is a perspective view of the die holder element.
Figure 10:
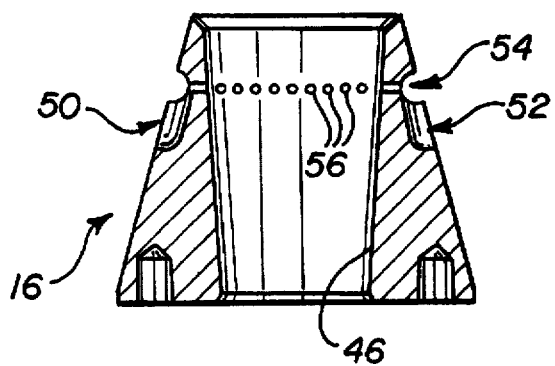
FIG. 10 is a side elevational view on the line 10—10 of FIG. 9.
Figure 11:
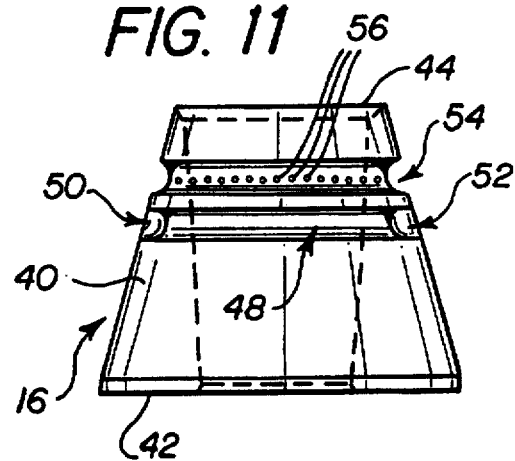
FIGS. 11, 12 and 13 are side, front and rear views, respectively, of the die holder.
Figure 12:
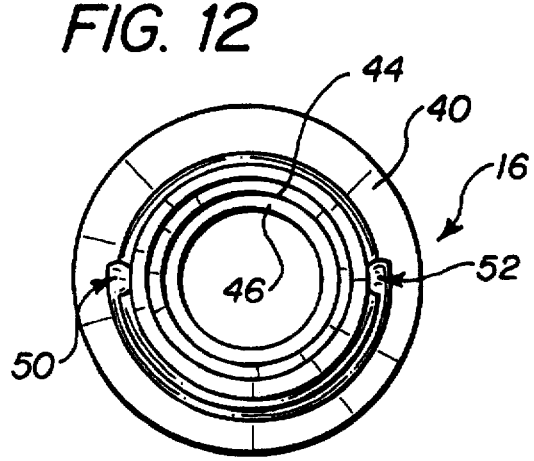
Figure 13:
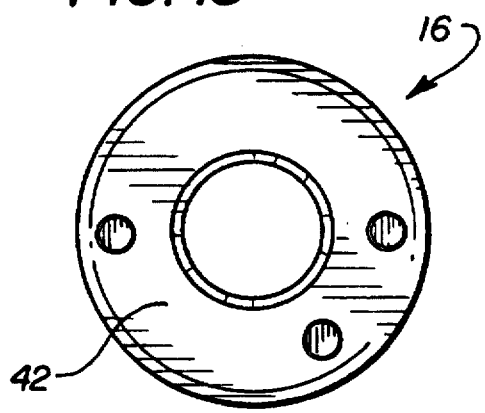
Figure 18:
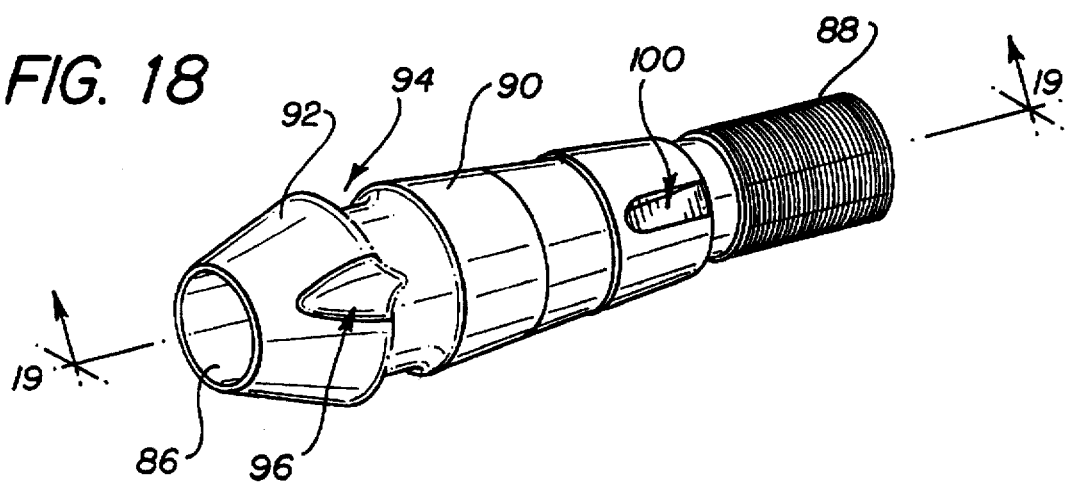
FIG. 18 is a perspective view of the tip holder/core tube element of the apparatus.
Figure 19:
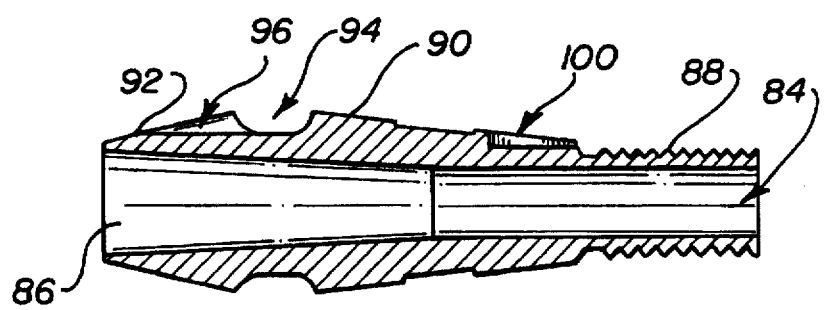
FIG. 19 is a side elevational view in section on the line 19—19 of FIG. 18.
Figure 20:
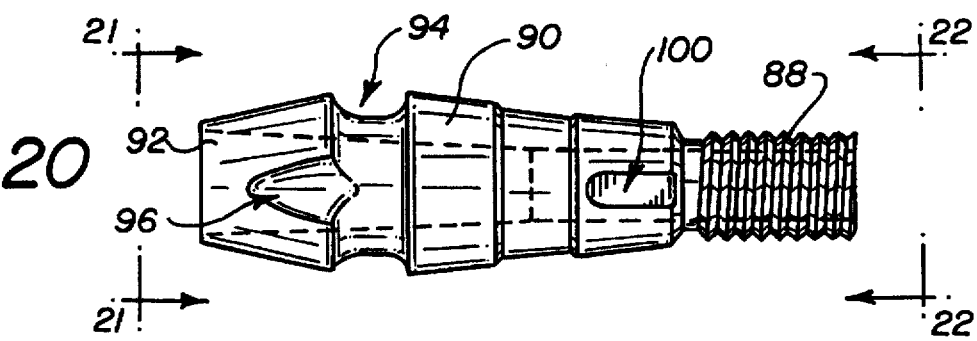
FIG. 20 is a full side elevational view of the tip holder, rotated 90° from the position of FIG. 19.

The completely assembled cross-head die apparatus of the invention, as shown in FIGS. 1 and 3, is generally denoted by reference numeral 10. Individual components of apparatus 10, as seen more fully in FIG. 2, are cylindrical body member 12, front retaining collar 14, die holder 16, die member 18, tip 20, tip holder/core tube 22 and rear retaining nut 24. Body member 12, shown individually in FIGS. 5 and 6 includes through, axial bore 26 with which first radial bore 28 and second radial bore 30 communicate. Radial bores 28 and 30 are internally threaded for connection thereto in conventional fashion of respective sources of first and second coating materials 32 and 34, respectively (FIGS. 3 and 4). The coating materials are typically plastics suitable for the intended application, heated to a flowable condition. Front portion 36 of body member 12 is externally threaded for engagement with internal threads 38 of collar 14 (FIGS. 7 and 8).

Proceeding from front to rear, the next element of the assembly is die holder 16, shown individually in FIGS. 9-13. Die holder 16 has a frustoconical external surface 40 extending between front and rear ends 42 and 44, respectively, and a through, axial bore defined by frustoconical, internal surface 46. First annular groove 48 extends 180° about external surface 40 and communicates at its ends through channels 50 and 52 with second annular groove 54 which extends the full 360° about surface 40. A succession of evenly spaced openings 56 extend through the die member between groove 54 and internal surface 46. As an indication of relative dimensions, for a die holder having a bore with diameters of 0.962" and 1.14" at its front and rear ends, respectively, groove 54 may be 0.18" in both width and depth with a total of thirty four openings 56, each having a diameter of 0.05".

Die member 18 has frustoconical external and internal surfaces 58 and 60, respectively, the latter terminating at orifice 62 in front wall 64 of the die member. External surface 58 extends from front wall 64 to a rearward end 66. Portion 68 of the die member extends rearwardly from end 66 of surface 58. External surface 70 of portion 68 is substantially cylindrical, having a diameter d slightly less than the diameter D at end 66 of surface 58. Annular groove 72 extends entirely about the die member at the forward end of portion 68.

Tip 20, as seen in FIGS. 16 and 17, has a through, axial bore 74 with a diameter slightly larger than that of the filamentary member to be coated by apparatus 10. The external surface of tip 20 is divided into two frustoconical portions, rear portion 76 diverging outwardly from rear end 78 toward front end 80, and forward portion 82 converging inwardly from rear to front, terminating at the front end of bore 74.

Figure 21:
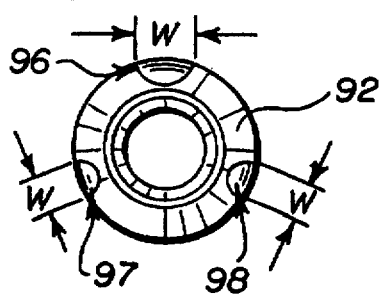
FIGS. 21 and 22 are front and rear elevational views, respectively, seen from the positions indicated by lines 21—21 and 22—22 of FIG. 20.
Figure 22:
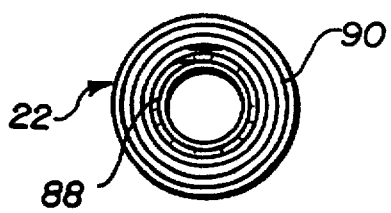

The tip holder or core tube 22 is shown individually in FIGS. 18-22. A through, axial bore is defined by cylindrical, rear portion 84 and frustoconical, forward portion 86. The external surface of tube 22 includes cylindrical, externally threaded, rear portion 88, intermediate portion 90 diverging outwardly from rear to front, and forward portion 92 converging inwardly from rear to front. Intermediate and forward surface portions 90 and 92 are separated by annular groove 94 which extends fully about tube 22. Three axial grooves 96, 97 and 98 extend forwardly from annular groove 94 into forward surface portion 92. As indicated in FIG. 21, axial groove 96 has a maximum width W which is greater than the equal widths w of axial grooves 97 and 98. The midpoints of axial grooves 97 and 98 are each spaced from the midpoint of axial groove 96 by 100°, thus being spaced 160° from one another. Keyway 100 is formed in intermediate surface portion 90.

The manner of assembly of the elements and their physical relationships in the fully assembled condition are best understood with reference to FIGS. 2-4. Core tube 22 is inserted in axial bore 26 of body member 12 from front to rear with intermediate portion 90 of the external surface of the tube in mating engagement with rear portion 26a (FIG. 6) of the internal surface of bore 26. Rotational orientation of tube 22 relative to body member 12 is established by key 102 (FIG. 3) extending into keyway 100. Tube 22 is secured in position by tightening nut 24 upon portion 88 against the rear surface of body member 12. Annular groove 94 is inwardly adjacent the inner end of first radial bore 28. The wider of the axial grooves in core tube 22, i.e., groove 96, is positioned 180° from the inner end of bore 28.

Tip 20 is inserted into the forward end of axial bore 86 of core tube 22, either before or after insertion of the core tube in axial bore 26. Frustoconical surface 76 is angled for mating engagement with the forward portion of bore 86. Since tip 20 is symmetrical about its central axis, rotational orientation is of no consequence.

The forward end of die member 18 is inserted into the rearward end of the bore in die holder 16, placing surfaces 46 and 58 in mating engagement. Die holder 16 is then inserted into the forward end of axial bore 26, placing external surface 40 of the die holder in mating engagement with internal surface portion 26b of the axial bore in body member 12. Collar 14 is threaded onto portion 36 and tightened against the forward surface of body member 12 to secure die holder 16 in its assembled position wherein the midpoint of annular groove 48 is inwardly adjacent the inner end of second radial bore 30, completing assembly of the elements.

Filamentary member 104, assumed for purposes of present discussion to be an electrical wire, is moved from a supply roll (not shown) positioned rearwardly of apparatus 10, through cylindrical portion 84 of the bore in core tube 22, bore 74 of tip 20 and orifice 62 of die member 18, and secured to a winding station (not shown) a suitable distance forwardly of the apparatus. As wire 104 is moved axially at a suitable speed through apparatus 10, a uniform, inner layer of first coating material 32 is deposited on the wire and an outer layer of second coating material 34 is deposited in covering relation to the inner layer.

The nature of the coating operation is best understood with reference to FIG. 3 and the enlarged fragment thereof in FIG. 4. First coating material 32 flows through radial bore 28 into annular groove 94 causing it to flow around and fill groove 94, then flow forwardly of the apparatus, through axial grooves 96, 97 and 98, as well as through a small (e.g., 0.015") clearance between bore 26 and the periphery of core tube 22 between the three axial grooves. Positioning wider groove 96 180° opposite the inlet of material 32, with the two narrower grooves 97, 98 on opposite sides with their midpoints each 80° from the midpoint of the inlet, as well as providing the aforementioned clearance, ensures an even distribution of material 32 about the established flow path.

Second coating material 34 flows from radial bore 30 into first annular groove 48 of die holder 16. Since external surface 40 of the die holder is in mating engagement with opposing portions of surface 26b of bore 26 both forwardly and rearwardly of groove 48, material 34 flows 90° in each direction about groove 48 and through channels 50 and 52 into second annular groove 54. Material 34 flows 360° about groove 54 and thence radially inwardly through openings 56, into the annular space between surface 70, including groove 72, of rear portion 68 of die member 18 and the opposing portion of surface 26b of bore 26. As is evident from close inspection of FIG. 4, material 34 flows a short distance through this annular space in a direction rearwardly of apparatus 10, as indicated by arrow 106, before reversing direction and flowing forwardly, in covering relation to the layer of first coating material 32. For clarity, two different types of stippling are used to illustrate first and second coating materials 32 and 34.

The path through which first coating material 32 is constrained to flow from its entry into bore 26, about annular groove 94, through axial grooves 96, 97 and 98 and the clearance between core tube 22 and bore 26 is termed a first flow path. Likewise, the path of second coating material 34 from radial bore 30 into annular groove 48, thence through channels 50 and 52 into annular groove 54, through openings 56 and rearwardly through the annular space between external surface 70 of rear portion 68 of die member 18 and the opposing surface of die holder 16 is termed a second flow path. The first and second flow paths merge at the rearward end of die member 18 and both the first and second coating materials flow through the third flow passageway, i.e., the frustoconical space between external surface portions of core tube 22 and tip 20, and internal surface 60 of die member 18 to orifice 62 therein.

Throughout the third flow path, second material 34 remains in covering relation to first material 32, and it is in this relation that the materials are applied as coatings to wire 104. After exiting apparatus 10, materials 32 and 34 begin to cool and harden, and the coated wire may be wound on a conventional spool a suitable distance forwardly of apparatus 10.

What is claimed is:

1. Cross-head die apparatus having a longitudinal axis for applying two layers of coating material to a filamentary member as the latter is moved longitudinally through said apparatus along a path parallel to said axis, said apparatus comprising:

a) a body member having a through, axial bore extending between front and rear ends, a first radial bore through which a source of a first, flowable coating material communicates with said axial bore at a first location therein, and a second radial bore through which a source of a second, flowable coating material communicates with said axial bore at a second location therein, between said front end and said first location;

b) guide means defining an enclosed, elongated conduit within said axial bore, parallel to said axis, establishing a path of movement of said filamentary member through said body member from rear to front;

c) a die member positioned within said axial bore and having a circular orifice of larger diameter than said filamentary member adjacent said front end and coaxial with said conduit;

d) means defining first, second and third flow passageways within said axial bore, said first and second radial bores communicating with said first and second flow passageways, respectively, and said third passageway being substantially conical, having first and second ends and communicating at said first end with both said first and second passageways and at said second end with said orifice; and e) at least a portion of said second passageway comprising an annular space within said axial bore having a forwardly disposed end communicating with said second radial bore and a rearwardly disposed end communicating with said third passageway, whereby said second coating material flows generally rearwardly through said annular space and thence forwardly into said third passageway in superposed relation with said first coating material for simultaneous deposit of both said first and second coating materials upon said filamentary member as the latter exits said orifice.

2. The invention according to claim 1 wherein said annular space is defined by an inner surface portion within said axial bore and a first outer surface portion of said die member.

3. The invention according to claim 2 wherein said first outer surface portion includes an annular groove at said forwardly disposed end and a substantially cylindrical portion extending between said groove and said rearwardly disposed end.

4. The invention according to claim 3 and further including a die holder having an outer surface portion in mating engagement with said axial bore and an inner surface portion in mating engagement with a second outer surface portion of said die member.

5. The invention according to claim 4 wherein said inner surface portion within said axial bore is formed by said die holder.

6. The invention according to claim 5 wherein said die holder includes a plurality of spaced openings interposed in said second passageway for flow of said second coating material into said annular space.

7. The invention according to claim 6 wherein said die holder includes a first, external groove having a portion positioned adjacent said second location to receive said second coating material, and a second, external groove with which said first groove communicates and wherein said spaced openings are formed.

8. The invention according to claim 1 wherein said first passageway is defined by spaced, opposed inner and outer surface portions of said axial bore and said guide means, respectively.

9. The invention according to claim 8 wherein said guide means comprises a first guide member having a rearward surface portion in mating engagement with a first portion of said axial bore and a forward surface portion forming said outer surface portion of said guide means.

10. The invention according to claim 9 wherein said guide means further comprises a second guide member in mating engagement with said first guide member and having an axial passageway defining at least a portion of said conduit.

11. The invention according to claim 10 wherein said second guide member includes a portion extending forwardly from said first guide member and having an external surface portion in spaced relation to a further surface portion within said axial bore to define said third passageway.

12. The invention according to claim 11 wherein said further surface portion comprises a conical, internal surface of said guide member.

13. The invention according to claim 9 wherein said first guide member forward surface portion comprises an annular groove extending 360° about said forward surface portion and positioned inwardly adjacent said first location to receive said first coating material, and a plurality of axial grooves through which said first material flows forwardly from said annular groove toward said third passageway.

14. The invention according to claim 13 wherein all of said forward surface portion is spaced from the inner surface of said axial bore.

15. The invention according to claim 14 wherein one of said axial grooves has a first maximum width and at least one other of said axial grooves has a second maximum width, less than said first maximum width.

16. The invention according to claim 15 wherein the number of said axial grooves is three, two of which have said second maximum width.

17. The invention according to claim 16 wherein said first guide member is rotationally oriented with respect to said body member to locate the midpoint of said one axial groove substantially 180° from the midpoint of said first location.

18. The invention according to claim 17 wherein the midpoints of said two axial grooves are located substantially 80° from and on opposite sides of said midpoint of said first location.

19. Cross-head die apparatus for applying first and second, flowable coating materials in separate, inner and outer layers to a filamentary member as the latter is moved longitudinally through said apparatus, said apparatus comprising:
   a) a body member having a through, axial bore extending between front and rear ends, a first radial bore communicating with said axial bore at a first position therein, and a second radial bore communicating with said axial bore at a second position therein between said first position and said front end;
   b) first means defining a first flow passage within said axial bore for flow of said first coating material from said first position generally toward said front end to a third position within said axial bore;
   c) second means defining a second flow passage within said axial bore for flow of said second coating material from said second position generally toward said rear end to said third position, where said first and second flow passages merge;
   d) third means defining a third flow passage through which said first and second coating materials flow in superposed relation from said third position generally toward said front end to a fourth position where said superposed layers are simultaneously applied to said filamentary member; and
   e) means defining a die orifice for passage of said filamentary member with said first and second coating materials in covering relation thereto in respective, inner and outer layers.

20. The invention according to claim 19 wherein said axial bore is circular in all radial planes, and each of said first, second and third flow passages extend 360° about said axial bore.

21. The invention according to claim 20 wherein the axial length of said second flow path is short in relation to the axial lengths of both said first and third flow paths.

22. The invention according to claim 21 and further including a die member having a front wall through which said die orifice extends, and a rear portion having a terminal end at said third position.

23. The invention according to claim 22 wherein said rear portion includes an annular, external surface extending axially from said second to said third position and defining a portion of said second flow passage.

24. The invention according to claim 23 wherein said die member includes a frustoconical, internal surface extending axially from said third to said fourth position and defining a portion of said third flow passage.

25. Cross-head die apparatus having a longitudinal axis and adapted to apply to a filamentary member a coating of two layers of material separately injected radially into said apparatus while in a flowable state as said filamentary member is moved longitudinally through said apparatus, said apparatus comprising:
   a) a body member having a through bore extending axially between front and rear ends, and first and second radial bores through which first and second flowable coating materials respectively communicate with said axial bore;
   b) a hollow core tube having an external surface with forward and rearward portions respectively configured to provide a first flow path for generally forward flow of said first material to a front end of said first flow path, and for mating engagement with a rear part of said through bore;
   c) a tip member having a through, axial passageway defining a longitudinal path of travel for said filamentary member and an external surface with a rear portion configured for mating engagement with the internal surface of said hollow core tube and a forward portion extending forwardly of said core tube within said through bore;
   d) a die member having a frustoconical external surface, a forward end with an orifice for passage of said filamentary member with said first and second materials coated thereon in superposed, first and second layers, and an internal cavity extending from communicating relation with said orifice to the rear end of said die member;
   e) a die holder having a through bore with a first surface portion in mating engagement with said die member external surface and means defining at least a portion of a second flow path for said second material, at least a portion of said second flow path being generally toward said body member rear end where said second path terminates at a rearmost end; and
   f) means defining a third flow path extending from a rearward end where said front end of said first flow path merges with said rearmost end of said second flow path, to a forward end where said superposed layers are simultaneously applied to said filamentary member.

26. The invention according to claim 19 wherein said portion of said second flow path is an annular space defined between a rearward, external surface portion of said die member and a second surface portion of said die holder bore.

27. The invention according to claim 25 wherein said core tube external surface includes an annular groove extending thereabout, and a plurality of axial grooves through which said annular groove communicates with the space surrounding said core tube forward surface portion.

28. The invention according to claim 27 wherein one of said axial grooves has a maximum width greater than the maximum width of at least one other of said axial grooves.

29. The invention according to claim 28 wherein the mid-point of said one axial groove is positioned substantially 180° from the mid-point of said first radial bore.

30. The invention according to claim 29 wherein the number of said axial grooves is three and the other two of said axial grooves are of equal maximum width and respectively positioned between opposite sides of said one axial groove and said first radial bore.

31. Cross-head die apparatus for simultaneously applying layers of first and second coating materials in superposed, inner and outer layers to a filamentary member as the latter is moved longitudinally through said apparatus from a rear to a front end thereof, said apparatus comprising:

a) a body member having a through bore with a longitudinal axis extending between said rear and front ends, said filamentary member moving parallel to said axis;

b) means defining a first flow passage within said body member completely surrounding said axis for flow of said first coating material in a direction toward said front end of said body member to a frontmost end of said first flow passage;

c) means defining a second flow passage within said body member completely surrounding said axis for flow of said second coating material in a direction toward said rear end of said body member to a rearmost end of said second passage;

d) means defining a third flow passage within said body member completely surrounding said axis, said third flow passage having a rearmost end where said frontmost end of said first flow passage merges with said rearmost end of said second flow passage for flow of both said first and second coating materials in superposed relation in a direction toward said front end of said body member to a frontmost end of said third flow passage; and e) means for simultaneously applying said first and second coating materials as inner and outer layers, respectively, to said filamentary member as said materials exit said frontmost end of said third flow passage.

32. The invention according to claim 31 wherein sources of said first and second coating materials communicate with said first and second flow passages, respectively, through respective first and second radial bores in said body member.

33. The invention according to claim 31 wherein said first, second and third flow passages are all positioned within said through bore.

34. The invention according to claim 31 and further including means defining a die orifice at said front end of said body member through which said filamentary member, with said coating materials in covering relation thereto, exits said apparatus.

* * * * *